United States Patent [19]

Loomis et al.

[11] 4,070,127
[45] Jan. 24, 1978

[54] FERRULE JOINT FOR SECTIONAL FISHING ROD

[75] Inventors: Gary A. Loomis, Woodland; Albert A. Fosha, Bellevue, both of Wash.

[73] Assignee: Lamiglas Corporation, Woodland, Wash.

[21] Appl. No.: 603,738

[22] Filed: Aug. 11, 1975

[51] Int. Cl.$^2$ .............................................. F16B 7/02
[52] U.S. Cl. ................................. 403/334; 43/18 GF
[58] Field of Search ............. 403/333, 334; 43/18 GF

[56] References Cited

U.S. PATENT DOCUMENTS

| 2,594,693 | 4/1952 | Smith | 43/18 GF |
| 3,469,338 | 9/1969 | Hills | 43/18 GF |
| 3,554,590 | 1/1971 | Tarantino | 403/293 |

FOREIGN PATENT DOCUMENTS

| 26,318 | 2/1931 | Australia | 403/334 |
| 1,082,664 | 9/1967 | United Kingdom | 43/18 GF |

*Primary Examiner*—Wayne L. Shedd
*Attorney, Agent, or Firm*—Dowrey & Cross

[57] ABSTRACT

The ferrule joint includes a ferrule and an element telescopically insertable into the ferrule to frictionally interlock two rod sections. The ferrule and insertable element are integral with respective mating ends of the two rod sections. The ferrule joint is particularly suitable for use with sectional rods fabricated of tubular hollow core reinforced resin rod blanks which are of relatively small cross section and which employ stiff fibers such as boron or graphite as resin reinforcement.

14 Claims, 7 Drawing Figures

FERRULE JOINT FOR SECTIONAL FISHING ROD

BACKGROUND OF THE INVENTION

The present invention relates to fiber reinforced resin fishing rods and more particularly to such rods fabricated in tubular, hollow core sections, wherein rod sections are joined by means of non-metallic ferrules.

The majority of fishing rods manufactured at the present time are fabricated of fiber reinforced resins in multiple sections. In the recent past, nearly all of these rods have been fabricated in sections from fiber reinforced resin fabrics that are wrapped about tapered, elongated mandrels and heated at elevated temperatures to cure the resin, thereby providing tapered, hollow core, tubular rod blanks. These rod blanks are then finished by the addition of line guides, handles and reel seats (to rod butt sections) and ferrules (at mated rod section ends).

Substantial emphasis is placed on ferrule design inasmuch as the interlocking, telescopic joints provided by ferrules tend to constitute dead spots in the assembled rods that markedly affect the overall rod performance. Metallic ferrules are being rapidly replaced with non-metallic ferrules of various designs. These non-metallic ferrules not only are intended to secure the rod sections together in axial alignment — as were the metallic ferrules — but also are intended to flex during use in order to minimize the effects of ferrule joints on overall rod performance. The design criteria are stringent inasmuch as a ferrule joint must be capable of withstanding substantial forces in use and must be capable of being produced economically, in addition to being as flexible as possible.

Three general categories of non-metallic ferrule joints have been utilized. One of the most common is patterned after the metallic ferrule in that a tubular reinforced resin sleeve is secured to the outer surface of the end of one rod blank section and extended axially outward to provide a tubular recess into which the end of another rod blank section may be telescopically inserted to frictionally interlock the rod sections together; the telescopically insertable rod blank end being provided with a counter, if desired as in U.S. Pat. No. 3,152,800 to Giampa et al, or otherwise reinforced to withstand the forces to which the joint will be subjected as in U.S. Pat. No. 3,835,569 to Gould, III et al. Another ferrule joint employs a tubular insert that is secured to the inner surface of the end of one rod section and extended axially outward to provide a tubular sleeve over which the end of another rod blank section may be telescopically engaged to frictionally interlock the rod sections together; the rod blank ends being appropriately reinforced to withstand the forces to which the joint will be subjected as in U.S. Pat. No. 3,613,287 to Grein. The third ferrule joint category utilizes the end of one rod section itself as the ferrule with the end of another rod section telescopically insertable into the rod section ferrule end to frictionally interlock the rod sections together; the rod section ferrule end being exteriorly reinforced as in U.S. Pat. No. 3,186,122 to Clock et al, or interiorly reinforced as in U.S. Pat. No. 3,830,008 to Johnson.

Ferrules of the above-mentioned categories, although generally satisfactory, have been limited, heretofore, primarily to so-called "fiberglass" rods which are composed of longitudinal strands of glass fiber embedded in a polymerized resin. Such fiberglass rod blanks are fabricated in tapered, tubular form of relatively large diameters to provide adequate section modulii along their length to withstand the forces to which they are subjected and to provide desired degrees of stiffness. However, the ferrule designs known heretofore are inadequate for use in rod construction employing stiffer reinforcing fibers such as graphite and boron wherein the rod blank cross sections are significantly smaller for desired degrees of stiffness. Such ferrule designs, when applied to graphite rods as an example, are either structurally inferior, or too inflexible, or so bulky as to be unsightly or a combination of the above, all of which constitute deficiencies rendering the overall rod design unacceptable. Furthermore, ferrules of the above-mentioned categories often require time consuming or complicated fabrication techniques that seriously affect the economical production of rods utilizing such ferrules.

SUMMARY OF THE INVENTION

The present invention provides a ferrule joint for multiple section fishing rods that does not suffer from the deficiencies hereinabove noted wih respect to known ferrule joints. This invention is particularly suited for rods fabricated with stiff reinforcing fibers such as boron and graphite, which are stiffer per unit length than fiberglass, from tapered tubular rod blanks of relatively small cross section. The ferrule of this invention is formed in the end of one rod blank and the mating end of another rod blank is appropriately formed for telescopic insertion into the ferrule to frictionally interlock the two sections together. The elements of the ferrule joint of this invention are thus integral with the rod blank sections and, in a preferred embodiment, are fabricated during fabrication of the rod blanks such that production of an otherwise finished rod blank inherently provides an appropriate integral element of the ferrule joint.

DETAILED DESCRIPTION OF THE DRAWINGS

Figure 1:
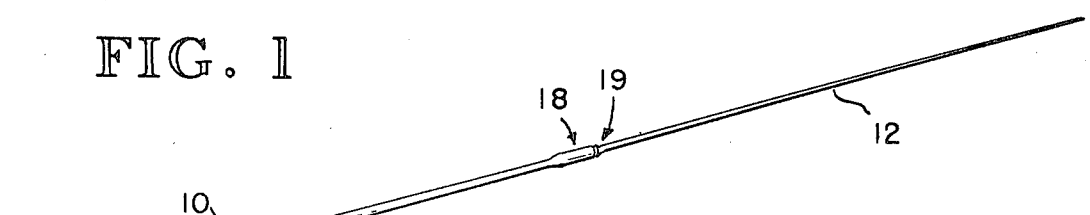
FIG. 1 is a perspective view of an assembled multiple section, fishing rod blank incorporating the ferrule joint of this invention.

The ferrule joint of this invention is represented in FIG. 1 approximately to scale. In the other figures the widths and tapers shown are proportionally large with respect to the lengths shown for purposes of illustration and emphasis. For example, in one actual embodiment of this invention, fabricated of graphite fiber reinforced resin, the diameter of the rod blank section adjacent the arrow associated with number 10 (FIG. 2) is about 6mm, the outer diameter of the ferrule element 18 (FIG. 2) is about 7mm, the length of ferrule element 18 (FIG. 2) is about 78mm, and the length of the insertable element 19 (FIG. 2) is about 38mm; the difference in diameter of the tapered portion of element 19 is about 0.1mm; the length of each rod blank section being about 123.8 cm and the assembled rod blank section tapering from a butt end diameter of about 8mm to a tip end diameter of about 2mm. In actual practice, therefore, the ferrule joint of this invention is as compact and streamlined as the rod blanks themselves.

Fiber reinforced resin rod blanks are fabricated from fiber-resin fabrics cut into "patterns", a pattern being an elongated piece of fabric that is wider at one end than the other and that has sides that taper from one end to the other in some predetermined fashion. The fabric may be composed of only longitudinally-oriented reinforcing fibers embedded in an uncured resin or of woven reinforcing fibers — some of which are transversely-oriented — embedded in an uncured resin. Each pattern is rolled onto an elongated, tapered mandrel, oriented longitudinally on the patterns and held in position by a helical overwrapping of heat shrinkable tape such as cellophane tape. This assembly is then heated to a temperature and for a period of time suitable to cure the resin. The helical overwrapping is then removed and the mandrel withdrawn to leave the tapered, tubular, hollow core, rod blank. The rod blank is then surface treated as by polishing, if needed or desired, to provide the finished rod blank. Subsequently, line guides, reel seat and handles are applied to the rod blanks to convert the blanks to finished fishing rods. A preferred embodiment of the present invention is fabricated utilizing the above-mentioned fabrication steps and, in addition, other steps to be described hereinafter. Thus, rod blanks — and resultant fishing rods — produced in accordance with the present invention do not necessitate abandonment of current fabricating methods. For example, the ferrule element 18 is sufficiently compact and streamlined that conventional cork grips may be slipped over it during assembly of the rod — a result not possible with many known sleeve ferrules.

Figure 2:
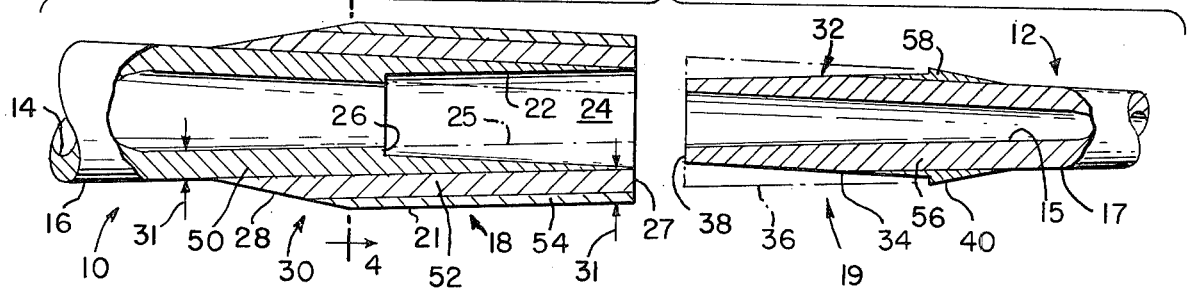
FIG. 2 is a longitudinal cross section through the ferrule joint of this invention illustrating the ferrule joint elements axially aligned but uncoupled.
Figure 6:
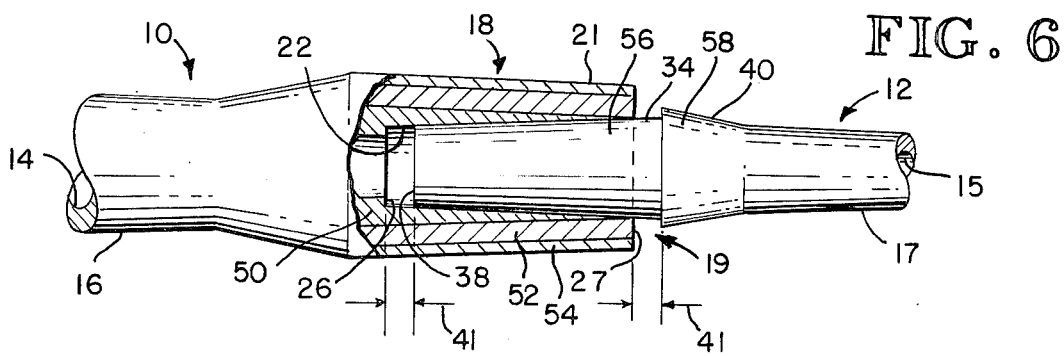
FIG. 6 is a longitudinal view in partial cross section of the FIG. 2 ferrule joint with the ferrule joint elements coupled.
Figure 7:
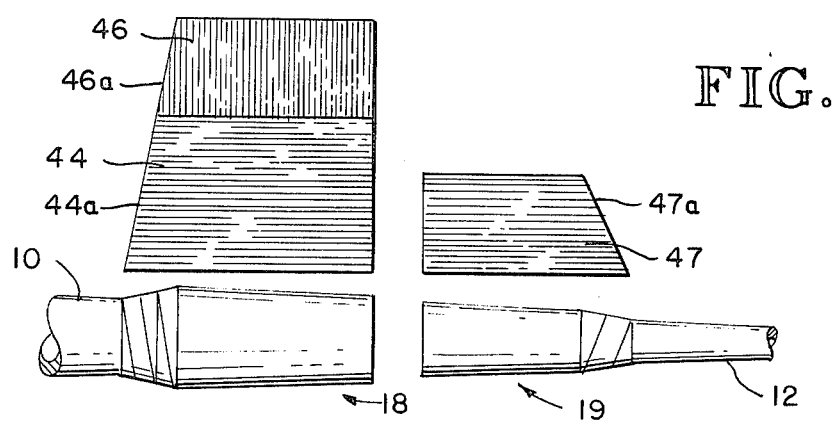
FIG. 7 is a longitudinal view of an uncoupled ferrule joint of this invention together with an illustration of fabric patterns which may be ulitized in the formation of the ferrule joint elements.

Commencing first with FIG. 7, a preferred ferrule joint in accordance with the present invention is shown as it would appear after the rod blanks have been cured. The basic rod blanks 10 and 12 constitute the elongated pattern wrapped about tapered mandrels as previously described. Additional patterns are then wrapped over the main patterns as shown at 18 and 19, regions 18 and 19 being the ferrule and ferrule joint insertable element, respectively. A preferred ferrule 18 includes, in additional to the main rod blank pattern, (the resulting shaft referenced by numeral 50 in FIGS. 2 and 6), a first additional pattern 44 wrapped around the main pattern (the resulting concentric layer referenced by numeral 52 in FIGS. 2 and 6), and a second additional pattern 46 wrapped around the pattern 44 (the resulting concentric layer referenced by numeral 54 in FIGS. 2 and 6), the resultant exterior appearing as shown in FIG. 7. A preferred insertable element 19 includes, in addition to the main rod blank pattern (the resulting shaft referenced by numeral 56 in FIGS. 2 and 6), an additional pattern 47 wrapped around the main pattern (the resultant concentric layer referenced by numeral 58 in FIGS. 2 and 6) the resultant exterior appearing as shown in FIG. 7. Upon application of the additional patterns (44 and 46 in the case of the rod blank 10, 47 in the case of rod blank 12) the rod blanks are overwrapped as previously described and cured. After curing, the rod blank ferrule joint ends 18 and 19 are machined to provide the ferrule bore 24 and the mating insertable element engagement surface 34 as shown in FIGS. 2 and 6. Thus, rod blanks may be provided with integral ferrule joint elements that are structurally sound, athestically pleasing, and ecomonically and efficiently fabricated.

With respect to the ferrule 18 shown in FIGS. 2, 3, 4, and 6, the rod blank shaft 50 is machined to provide a frusto-conical cavity or bore 24 bounded by surface 22 of progressively smaller cross section as the cavity extends inward from the rod blank end 27. As can be appreciated from FIGS. 2 and 6, the concentric layers 52 and 54 must be applied as reinforcement to the rod blank shaft 50 before bore 24 is machined. Such concentric layers not only enable the provision of bore 24, but also add to the section modulus of the rod blank in the region of the ferrule to strengthen the ferrule.

Figure 5:
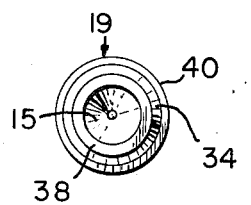
FIG. 5 is an end elevation view of the rod blank end of FIG. 2 that is insertable in the ferrule.

With respect to the insertable element 19 shown in FIGS. 2, 5 and 6, the rod blank shaft 56 is machined to provide a frusto-conical insert, bounded by the surface 34, of progressively smaller cross section as the insert extends outward — the insert configuration matching the configuration of ferrule bore 24 but with slightly greater diameter to promote a friction fit. As will be appreciated from FIG. 2 the concentric layer 58 is removed during maching except for a shoulder 40. Layer 58 provides reinforcement of shaft 56 on commencement of machining and also provides additional material to insure that the resultant tapered insert surface 34 is uniformly circular in cross section. This latter feature is significant in that, as the actual embodiment earlier described illustrates, the degree of taper may be quite small, and the additional material will make up for any out-of-round condition at the base of the insert as might be obtained by wrapping a main shaft pattern around a mandrel. That is to say, the additional material provided by layer 58 ensures that normal variations of diameter in the main rod blank will not result in an undersized insert. Furthermore, by building up the shaft 56, the resultant thickness of the finished insert end 38 is sufficient to be structurally sound.

Because the "as-wrapped" main rod blanks will normally have variations in both inside and outside diameters, it is highly desirable that ferrule bore 24 and insert surface 34 be machined to obtain the frictionally mating surfaces that will interlock the ferrule joint elements together when the rod is assembled. Machining these portions will provide closer tolerances in a more efficient and economical manner than can be consistently obtained by casting or forming these portions during the curing stage.

Under even normal use, a fishing rod is subjected to severe longitudinal bending loads. A ferrule joint, of course, must be strong enough to resist these loads. As bending loads are transmitted across the ferrule joint, the inserted element exerts a prying force tending to split the ferrule. These prying forces are applied to their fullest extent in the vinicity of the base 26 of the ferrule bore 24. The ferrule of the present invention, as is apparent from FIGS. 2 and 6, is thickest in this region to maximize the ferrule resistance to these forces as a result of layers 52 and 54 being extended rearward beyond the depth of the ferrule bore 24. (Layer 54 provides the primary resistance to prying forces as will be described hereinafter). The rearward surface 28 of the ferrule provides a transition from the smaller main shaft diameter to the larger ferrule diameter.

The ferrule shown in the drawings comprises two reinforcing layers 52 and 54 — the inner layer 52 being provided by a pattern 44 in the form of longitudinally-oriented reinforcing fibers embedded in resin and outer layer 54 being provided by a pattern 46 in the form of transversely-oriented reinforcing fibers embedded in resin. Thus, layer 52 provides additional longitudinal strength to resist bending forces imposed on the ferrule and layer 54 provides hoop strength to resist the prying forces described above and bursting forces imposed on the ferrule by insertion of element 19. The pattern sides 44a and 46a are inclined as shown to provide the transition surface 28. A suitable cross-woven fabric having both longitudinal and transverse reinforcing fibers could be provided as pattern 44 or pattern 46 or as a pattern having the combined configuration of patterns 44 and 46.

The pattern 47 for insertable element 19 may be provided similarly to pattern 44, the inclined side 47a providing the transition surface and shoulder 40.

In the embodiment shown in the drawings, the ferrule joint patterns when wrapped as previously described and the rod blanks cured, become an integral part of the respective rod blanks. After curing, there would be no structurally discernable line or surface dividing the adjacent layers as depicted in the drawings. With respect to ferrule 18, however, it may be appropriate to separately fabricate a sleeve having the configuration of wrapped patterns 44 and 46. In this instance, the sleeve could be secured to the main rod blank shaft 50 by a suitable bonding agent, or by curring the two together such that the resin becomes monolithic.

Figure 3:
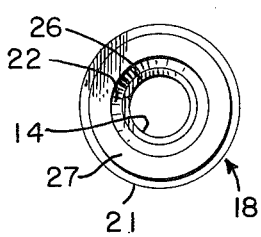
FIG. 3 is an end elevation view of the ferrule of FIG. 1.
Figure 4:
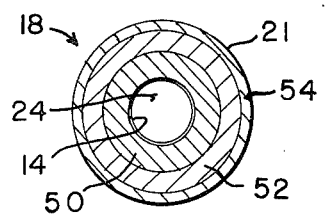
FIG. 4 is a cross section taken along the line 4—4 in FIG. 2.

The ferrule 18 shown in FIGS. 2-4 includes a generally cylindrical outer surface 21 substantially parallel to and of increased diameter than rod blank outer surface 16 and a generally frusto-conical inner surface 22 inclined to rod blank inner surface 14. Inner surface 22 forms an axial bore 24 coaxially aligned with and tapered toward inner surface 14. This bore is of predetermined angular taper formed by relieving the end portion of inner surface 14, as depicted by broken lines 25. Inner surface 22 extends between the terminus of bore 24, where it merges with an annular shoulder 26, and the enlarged open end of bore 24, where it intersects the outline of outer surface 16. While preferably the diameters of the reduced and enlarged diameter ends of inner surface 22 substantially correspond to those of inner and outer surfaces 14 and 16, respectively, it will be understood that their relationship may vary, depending upon the angular taper of bore 24, wall thickness of the axially adjacent portion of rod section 10, and other factors.

The ferrule 18 is of progressively increasing wall thickness, measured between its outer and inner surfaces 21 and 22, proceeding from end 27 of minimum wall thickness toward integrally formed rod section 10. The ferrule 18 terminates in inclined outer surface 28 which merges with outer surface 16 at an axial location sufficiently removed from the terminus of bore 24 to form a transition portion 30 of maximum wall thickness adjacent the terminus of bore 24. In most practical applications, the wall thicknesses of the ferrule are selected to provide sufficient strength against applied bending, prying and bursting loads, without adversely affecting the rod action obtained. The wall thicknesses selected are related to the amount of material removed to form bore 24 (or the angular taper and depth of bore 24), the wall thickness of the axially adjacent portion of rod section 10, the strength of material used to form the rod, and anticipated rod loadings. To minimize weight and adverse influence upon rod action, the wall thickness selected is kept to the minimum necessary thickness, with a suitable safety factor, depending upon the particular application. Preferably, the wall thickness of end 27 approximates the wall thickness of the axially adjacent portion of rod section 10, as depicted by the two pairs of opposed arrows 31 in FIG. 2. The wall thickness of the transition portion 30, measured between inner surface 14 and outer surfaces 21 and 28, is sufficiently greater than the wall thickness of end 27, or the average wall thickness of the ferrule 18, to withstand prying and bursting forces applied by the insertable element 19.

The insertable element 19 shown in FIGS. 2 and 5 includes a generally tubular tip portion 32. The tip portion includes an outer generally frusto-conical surface 34 inclined to rod blank inner surface 15 and having a tapered outline substantially registering with bore 24. Surface 34 is of substantially identical taper but slightly greater diameter than that of inner surface 22 to promote a friction fit and is formed by relieving the end portion of rod blank outer surface 17, as depicted in broken lines 36. Surface 34 extends between an end 38 of reduced wall thickness, intersects the outline of outer surface 17, and terminates at an annular shoulder 40 upstanding from outer surface 17. Rod inner surface 15 extends coaxially through tip portion 32. Thus, the wall thickness of tip portion 32, measured between surfaces 15 and 34, progressively increases proceeding toward integrally formed rod section 12.

To join the ferrule and insertable element sections, tip portion 32 is inserted into bore 24 such that surfaces 22 and 34 are in substantially line-to-line interfacing contact, as depicted in FIG. 6. In this condition, the ferrule joint is of substantially uniform wall thickness, measured between surfaces 15 and 21, along the length of bore 24, as shown (FIG. 6). In most practical applications, the mating contact surfaces 22 and 34 are formed of sufficient axial length and taper that the tip end 38 and shoulder 40 are at close spacing, as depicted by the two pairs of opposed arrows 41 in FIG. 6, to the shoulder 26 and ferrule end 27, respectively, when the ferrule 18 and insertable element 19 are fully engaged. Consequently, as the mating contact surfaces 22 and 34 are worn away, positive engagement is obtained merely by increasing the depth of penetration of the insertable element within bore 24, thereby reducing the indicated shoulder-end spacings. To indicate tip penetration within the bore, and hence the amount of wear of contact surfaces 22 and 34, the shoulder 40 may be formed adjacent surface 34 in such an axial disposition that it engages end 27 at the fully worn condition of surfaces 22 and 34.

With respect to FIG. 7, the widths of patterns 44 and 46, and hence the number of additional wraps applied to the ferrule 18, are selected to provide a certain minimum thickness wall of sufficient strength to withstand applied loads, with minimum adverse effects upon rod action. In most practical cases, the number of wraps formed by pattern 44 are sufficient to provide sufficient material to replace the strength lost during the ferrule reaming operation. The number of wraps formed by pattern 46 is sufficient to provide hoop strength to resist applied prying and bursting forces in particular. The number of additional wraps formed by pattern 47 applied to the insertable element 19 is sufficient to form shoulder 40.

Although the wall thickness of element 19 will contribute to the overall bending strength of the ferrule joint, the degree of contribution is unpredictable. This is so because under load the mating surfaces 22 and 34 will tend to slip relative to one another. Furthermore, normally there will exist a gap 41 (FIG. 6) between the inserted end of element 19 and the internal end 26 of bore 24 and in this region bending stress will be larger and must be absorbed by the ferrule 18. For these reasons, the number of wraps formed by pattern 44, providing layer 52, must be sufficient to provide a ferrule bending strength corresponding to the bending strength of the main rod blank.

The term "fishing rod blank" as used in the specification and claims, refers to both a rod blank prior to conversion into a fishing rod and to a rod blank once the necessary elements are added to convert it into a fishing rod.

While one preferred embodiment of the invention has been illustrated and described hrein, it will be recognized that variations will become apparent to one of ordinary skill in the art. Accordingly, the invention is not to be limited to the specific embodiment illustrated and described herein and the true scope and spirit of the invention are to be determined by the reference to the appended claims.

The embodiments of the invention in which an exclusive property is claimed are defined as follows:

1. A fishing rod blank which comprises at least two flexible tapered reinforced resin hollow core shafts, an end of one shaft constituting a ferrule having a tapered bore extending inwardly from said one shaft end and an end of the other shaft providing an element insertable in said ferrule to frictionally interlock the shafts together, said ferrule including an outer concentric layer reinforcement made up of fiber reinforced resin superimposed on said one shaft about said bore as an external reinforcement to resist bending and prying forces to which said ferrule may be subjected, said element consisting of a hollow core end portion of said other shaft, an outer concentric layer enlargement made up of fiber reinforced resin superimposed on said other shaft adjacent said other shaft end portion, and an outer tapered contact surface formed by said other shaft end portion and said concentric layer enlargement for frictionally engaging said bore, the wall thickness between said outer contact surface and the hollow core of said other shaft progressively decreasing from said outer concentric layer enlargement toward said other shaft end but exceeding a minimum wall thickness sufficient to withstand applied forces without interior reinforcement, while permitting said ferrule and said element to flex with said shafts when interlocked together.

2. The fishing rod blank of claim 1 wherein said outer concentric layer reinforcement comprises an inner portion composed of essentially longitudinally-oriented reinforcing fibers embedded in resin and an outer portion composed of essentially transversely-oriented reinforcing fibers embedded in resin.

3. The fishing rod blank of claim 1 wherein said outer concentric layer reinforcemnt has a composite wall thickness at said one shaft end approximately as thick as the wall thickness of said one shaft adjacent the inner terminus of said bore.

4. The fishing rod blank of claim 1 wherein said outer concentric layer reinforcement is provided as a fabric of uncured fiber reinforced resin wrapped around said one shaft and said fabric cured in situ.

5. The fishing rod blank of claim 1 wherein said outer concentric layer reinforcement is provided as a first fabric of uncured fiber reinforced resin wrapped around said one shaft, the reinforcing fibers of said first fabric being essentially longitudinally-oriented, and as a second fabric of uncured fiber reinforced resin wrapped around said first fabric, the reinforcing fibers of said second fabric being essentially transversely-oriented, and said first and second fabrics cured in situ.

6. The fishing rod blank of claim 1 wherein said other shaft and said outer concentric layer enlargement have a composite wall thickness which is sufficiently thicker than the wall thickness of an adjacent portion of said other shaft that said minimum wall thickness will be exceeded while uniformly decreasing the wall thickness between said outer contact surface and the hollow core of said other shaft from said outer concentric layer enlargement toward said other shaft end.

7. The fishing rod blank of claim 1 wherein said outer concentric layer enlargement includes an outer concentric shoulder superimposed on said other shaft at a location spaced from the end thereof, said contact surface extending to said shoulder.

8. The fishing rod blank of claim 7 wherein the portion of said outer contact surface adjacent said shoulder is formed by the exterior of said outer concentric layer enlargement.

9. The fishing rod blank of claim 1 wherein said one shaft and said outer concentric layer reinforcement have a composite wall thickness at said one shaft end approximately as thick as the wall thickness of said one shaft adjacent the inner terminus of said bore, said other shaft and said outer concentric layer enlargement having a composite wall thickness which is sufficiently thicker than the wall thickness of an adjacent portion of said other shaft that said minimum wall thickness will be exceeded while uniformly decreasing the wall thickness between said outer contact surface and the hollow core of said other shaft from said outer concentric layer enlargement toward said other shaft end.

10. The fishing rod blank of claim 1 wherein said tapered bore is formed by an interior relief surface in the shaft wall of the one shaft and said outer contact surface is formed by an exterior relief surface in the shaft wall of the other shaft and said outer concentric layer enlargement.

11. The fishing rod blank of claim 1 wherein said outer concentric layer reinforcement is integral with said one shaft.

12. The fishing rod blank of claim 1 wherein said outer concentric layer enlargement is integral with said other shaft.

13. The fishing rod blank of claim 1 wherein said outer concentric layer reinforcement is integral with said one shaft, and said outer concentric layer enlargement is integral with said other shaft.

14. A ferrule joint for a fishing rod blank made up of two flexible tapered reinforced resin hollow core shafts, the ferrule joint comprising: a ferrule integral with the end of one shaft and having a tapered bore extending inwardly from said one shaft end, and an element integral with the end of the other shaft and insertable in said ferrule to frictionally interlock the shafts together, said ferrule including an outer concentric layer reinforcement made up of fiber reinforced resin superimposed on said one shaft about said bore as an external reinforcement to resist bending and prying forces to which said ferrule may be subjected, said element consisting of a hollow core end portion of said other shaft, an outer concentric layer enlargement made up of fiber reinforced resin superimposed on said other shaft adjacent said other shaft end portion, and an outer tapered contact surface formed by said other shaft end portion and said concentric layer enlargement for frictionally engaging said bore, the wall thickness between said outer contact surface and the hollow core of said other shaft progressively decreasing from said outer concentric layer enlargement toward said other shaft end but exceeding a minimum wall thickness sufficient to withstand applied forces without interior reinforcement, while permitting said ferrule and said element to flex with the shafts when interlocked together.

* * * * *